United States Patent
Chen (10) Patent No.: US 6,202,732 B1
(45) Date of Patent: Mar. 20, 2001

(54) PLEATED CAR CURTAIN

(76) Inventor: Yin-Wen Chen, No. 23, Lane 207, Kao-Feng Road, Hsin-Chu (TW)

( * ) Notice: Subject to any disclaimer, the term of this patent is extended or adjusted under 35 U.S.C. 154(b) by 0 days.

(21) Appl. No.: 09/456,935

(22) Filed: Dec. 7, 1999

(51) Int. Cl.[7] .................................................. B60J 1/20
(52) U.S. Cl. ................... 160/370.23; 160/84.04; 160/DIG. 2; 296/97.7; 296/97.9
(58) Field of Search ..................... 160/370.21, 370.22, 160/370.23, 84.01, 84.04, DIG. 2; 296/97.7, 97.8, 97.9, 97.1

(56) References Cited

U.S. PATENT DOCUMENTS

| | | | |
|---|---|---|---|
| Re. 33,804 | * | 1/1992 | Phillips .............................. 160/84.04 |
| 1,220,888 | * | 3/1917 | Porter ................................ 160/84.04 |
| 2,109,160 | * | 2/1938 | Yurkovich .................. 160/DIG. 2 X |
| 2,596,836 | * | 5/1952 | Bruhl ............................. 160/370.21 |
| 2,614,630 | * | 10/1952 | Moszelt .......................... 160/370.21 |
| 2,913,211 | * | 11/1959 | Francis ........................ 160/DIG. 2 X |
| 3,443,860 | * | 5/1969 | Luboshez ...................... 160/84.04 X |
| 3,521,692 | * | 7/1970 | Johnson et al. .............. 160/84.04 X |
| 4,431,268 | * | 2/1984 | Ohno et al. ........................... 350/288 |
| 4,727,920 | * | 3/1988 | Siegler ........................ 160/370.23 X |
| 4,848,825 | * | 7/1989 | Niernberger ................ 160/370.23 X |
| 4,865,106 | * | 9/1989 | Wichelman ....................... 160/84.04 |
| 4,886,104 | * | 12/1989 | Eldridge, Jr. .................... 160/370.23 |
| 4,958,880 | * | 9/1990 | Champane .................. 160/370.23 X |
| 5,378,518 | * | 1/1995 | Wang ..................................... 428/65 |
| 5,937,929 | * | 8/1999 | Chen ................................ 160/370.23 |

* cited by examiner

*Primary Examiner*—Bruce A. Lev
(74) *Attorney, Agent, or Firm*—Pro-Techtor International Services (57) ABSTRACT

A pleated car curtain for covering a car window, includes: a curtain made of thin, sun-protective material, having a plurality of pleats parallel to lateral edges and a plurality of pleated edges between said pleats; two reinforcing strips on the lateral edges of the curtain; two ears, respectively attached to the two reinforcing strips; and two fixing elements, fixed on the car window on two sides thereof, respectively holding the two ears when the curtain is in use. The curtain is produced using high temperatures and pressures so that the shape of the plurality of pleated edges is preserved as acute angles when the curtain is folded and unfolded.

2 Claims, 11 Drawing Sheets

PLEATED CAR CURTAIN

BACKGROUND OF THE INVENTION

1. Field of the Invention

The present invention relates to a pleated car curtain, particularly to a pleated car curtain which is easily hung on a car window.

2. Description of Related Art

Current sun-protective shields used in cars basically are of one of two types: curtains fixed on car windows and shields that are movable. A fixed curtain for covering a car window mostly is made of pleated sun-protective material with upper and lower edges. Guiding cords run along the upper and lower edges and across the car window, with ends fixed on the car window, guiding the curtain, such that the curtain stays parallel to the car window when opened or closed. This arrangement provides effective protection from the sun, with the curtain stably held.

A fixed curtain, however, is normally fixed on the rear end of the car window and therefore not easily dismounted. When not in use, the curtain is therefore just folded. With the car in motion, no unhindered view out of the car is possible, a remaining dead angle adds to driving risks.

Figure 8:
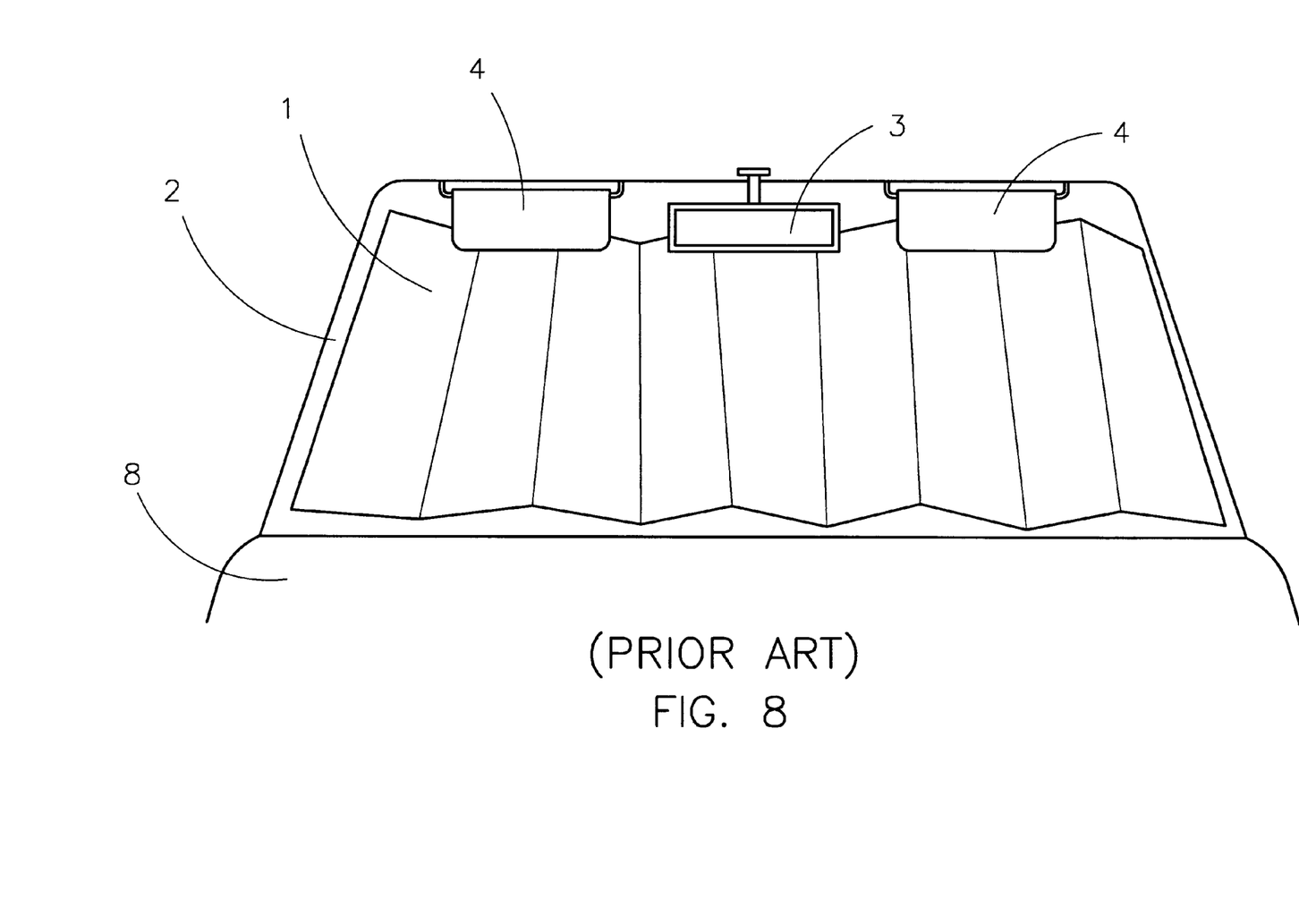
FIG. 8 (prior art) is a schematic illustration of a conventional board-like movable sun-protective car shield when used.

A movable shield has no guiding cords and during use has to be fixed by other means. As shown in FIG. 8, a conventional board-like movable sun-protective shield 1 for covering a car window 2 has a board with upper and lower edges that can be doubled on itself. During use, the board is opened, the lower edge thereof is laid on a dashboard 8, and the upper edge thereof is held by a rear-view mirror 3 and sun visors 4. Only then the upper edge of the sun-protective shield 1 is prevented from coming down, making use of the sun-protective shield 1 inconvenient.

Figure 8A:
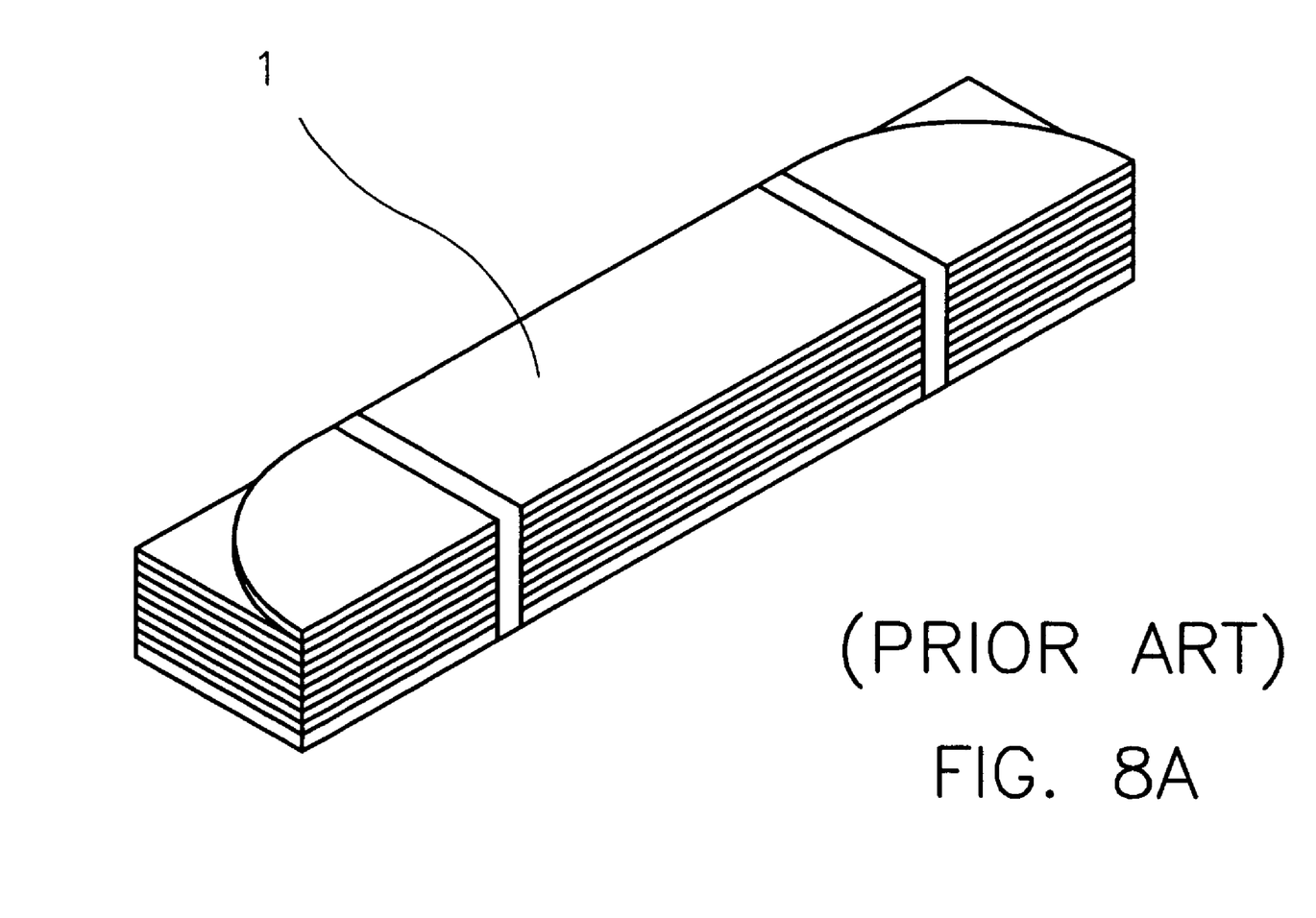
FIG. 8A (prior art) is a schematic illustration of a conventional board-like movable sun-protective car shield when folded.

Furthermore, as shown in FIG. 8A, the sun-protective shield 1 has a considerable thickness and takes up a relatively large volume when folded, such that storage in a car is not convenient, as well.

Figure 9:
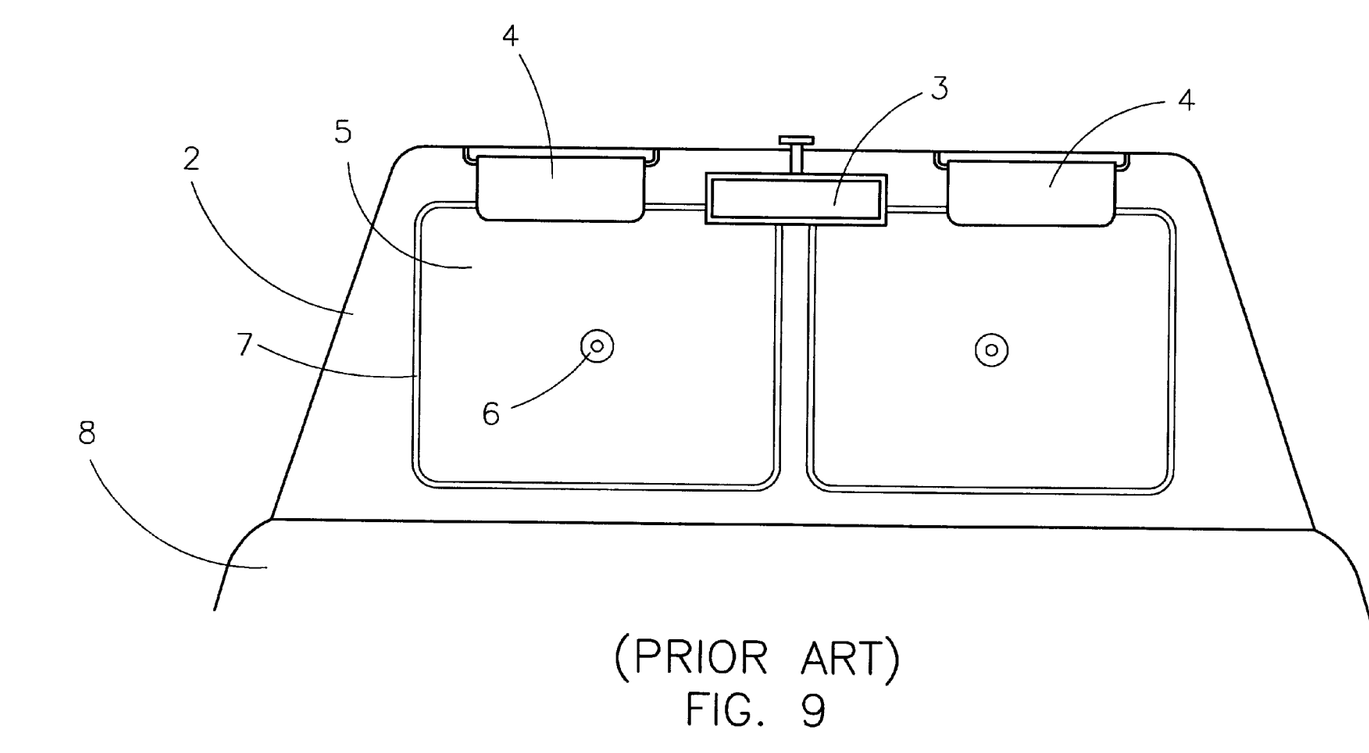
FIG. 9 (prior art) is a schematic illustration of a conventional soft movable sun-protective car shield with suction cup when used.

Referring to FIG. 9, a soft movable sun-protective shield 5 has a suction cup 6 in a central position. The sun-protective shield 5 is made of a flexible board with a reinforcing rim 7. Being soft, the sun-protective shield 5 has only a limited area, and covering a large car window requires using several sun-protective shield 5. When the sun-protective shield 5 is not used, the suction cup 6 is pulled away from the car window 2, and the reinforcing rim 7 is bent into small curves to allow the sun-protective shield 5 to be stored in a small volume. This, however, is a difficult and awkward procedure.

Figure 9A:
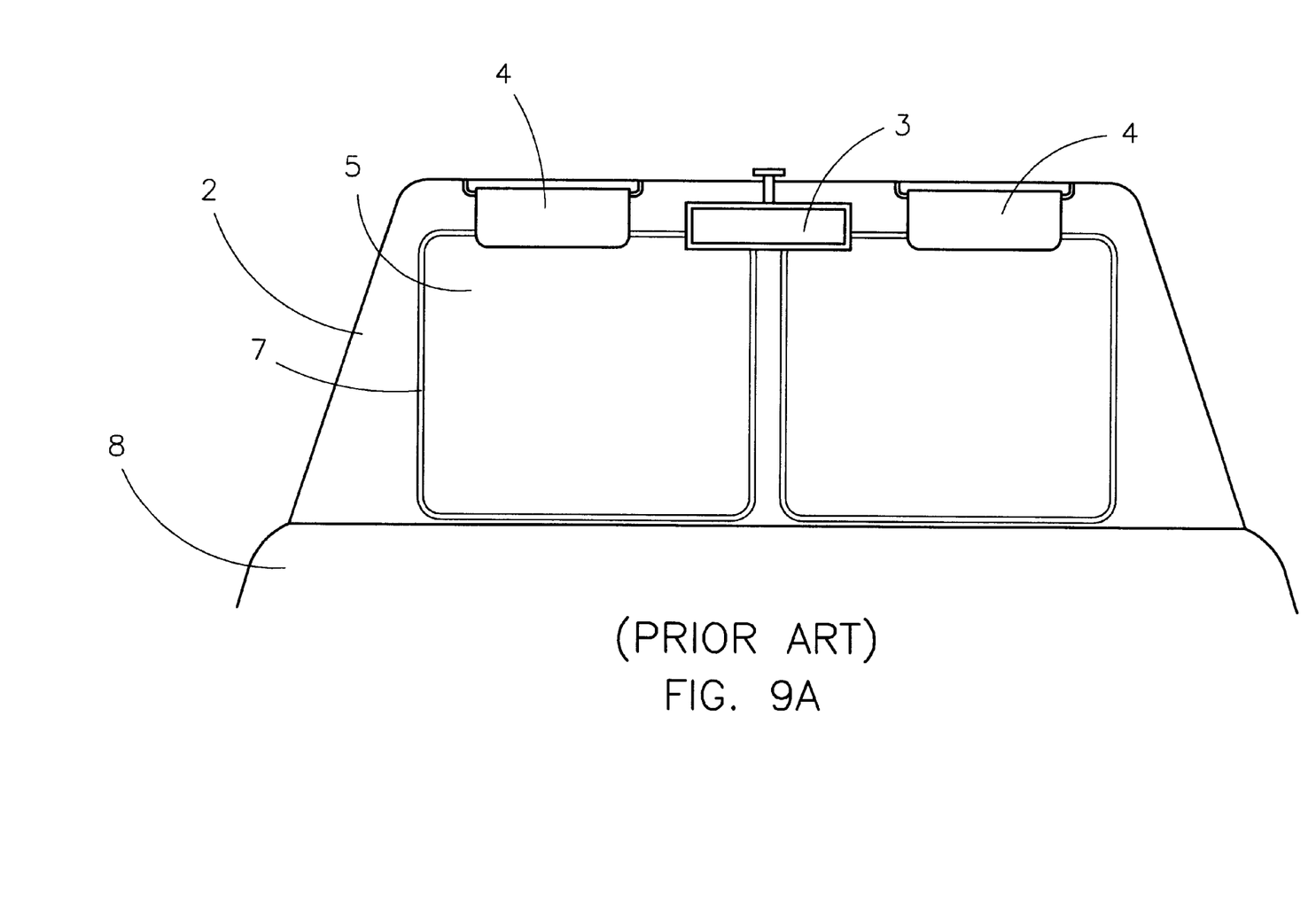
FIG. 9A (prior art) is a schematic illustration of a conventional soft movable sun-protective car shield without suction cup when used.

The sun-protective shield 5 is also made without the suction cup 6. As shown in FIG. 9A, the rear-view mirror 3 and the sun visors 4 have to be employed to hold the sun-protective shield 5, which is rather inconvenient.

SUMMARY OF THE INVENTION

The main object of the present invention is to provide a pleated car curtain of simple structure and little weight.

Another object of the present invention is to provide a pleated car curtain which can be fixed on a car window and provides effective protection from the sun.

The present invention can be more fully understood by reference to the following description and accompanying drawings.

DETAILED DESCRIPTION OF THE PREFERRED EMBODIMENTS

The present invention is used to cover a car window 2 of a car.

Figure 1:
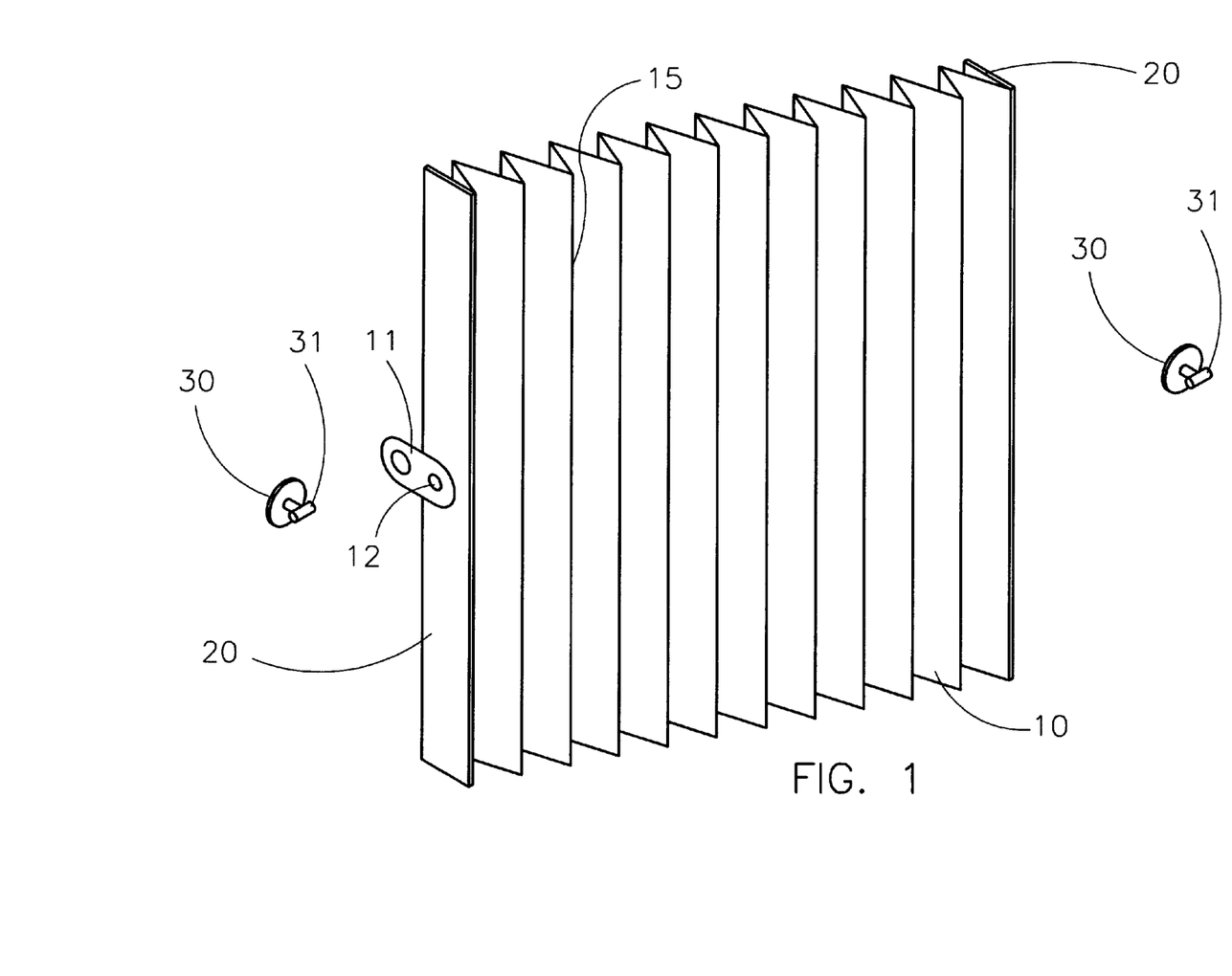
FIG. 1 is a perspective view of the structural parts of the present invention.

As shown in FIG. 1, the pleated car curtain of the present invention in a first embodiment mainly comprises: a curtain 10, made of sun-protective, thin material and pleated and having a width, a height, a left end and a right end; two reinforcing strips 20 on the left and right ends of the curtain 10, reinforcing the left and right ends of the curtain 10 to maintain a straight form when the curtain 10 is unfolded; and two fixing elements 30 for fixing the left and right ends of the curtain 10 during use thereof. Two ears 11 are attached to the reinforcing strips 20. During use of the present invention, the ears 11 are hung over the fixing elements 30, so that the curtain 10 covers the car window 2 and has a protective effect. When the car is started, the ears 11 are removed from the fixing elements 30, and the curtain 10 is stored away, not hindering sight from inside the car.

Figure 2:
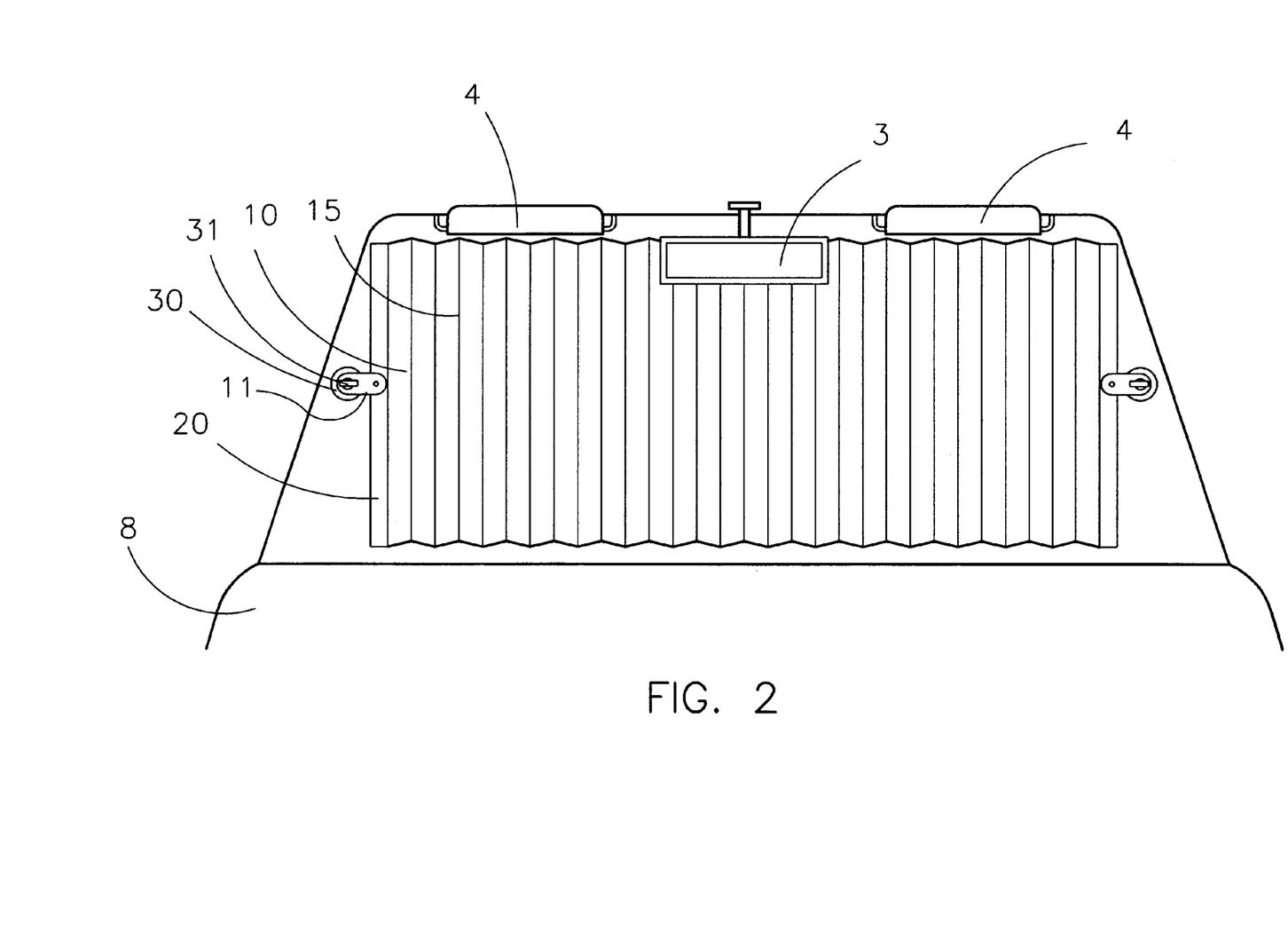
FIG. 2 is a front view of the pleated car curtain of the present invention when mounted in a car window.

Referring to FIGS. 1 and 2, the fixing elements 30 are attached to the car window 2 on opposite lateral ends thereof. Each of the fixing elements 30 has a hook 31. Each of the ears 11 has a hole 12. The holes 12 of the ears 11 are respectively hung over the hooks 31 to fix the left and right ends of the curtain 10 on the car window 2.

Figure 2A:
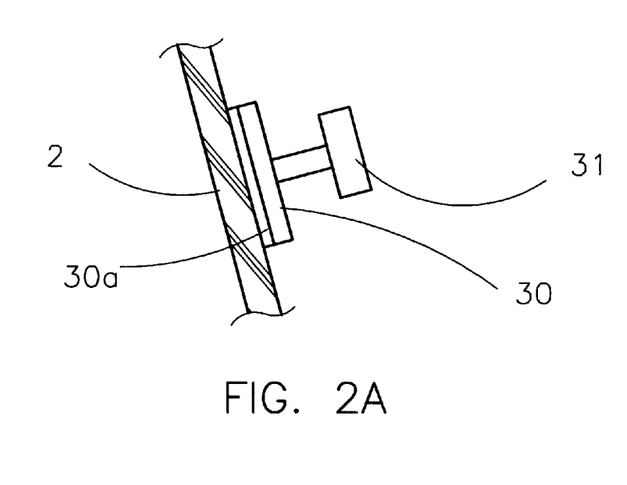
FIG. 2A is a side view of the fixing element of the present invention, the fixing element glued to the car window.
Figure 2B:
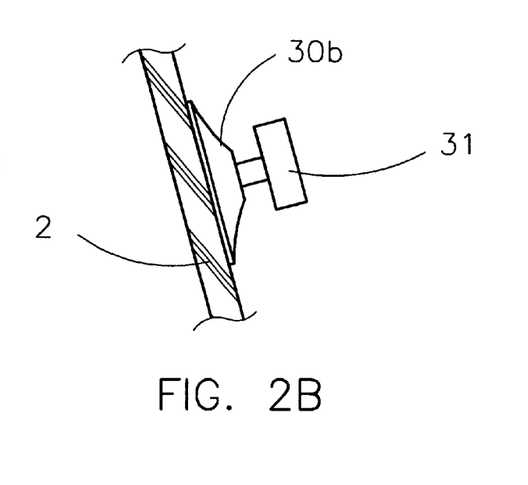
FIG. 2B is a side view of the fixing element of the present invention, the fixing element attached to the car window by suction.

Each of the fixing elements 30 is attached to the car window alternatively by one of various ways. As shown in FIG. 2A, a glue layer 30a lies between each of the fixing elements 30 and the car window 2, holding together the fixing elements 30 and the car window 2. Alternatively, as shown in FIG. 2B, each of the fixing elements 30 has a suction cup 30b, held on the car window 2 by suction.

Figure 2C:
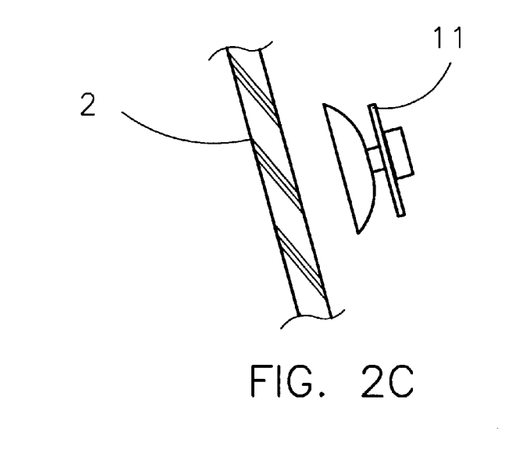
FIG. 2C is a side view of one the ears of the present invention, attached to the car window by suction.
Figure 2D:
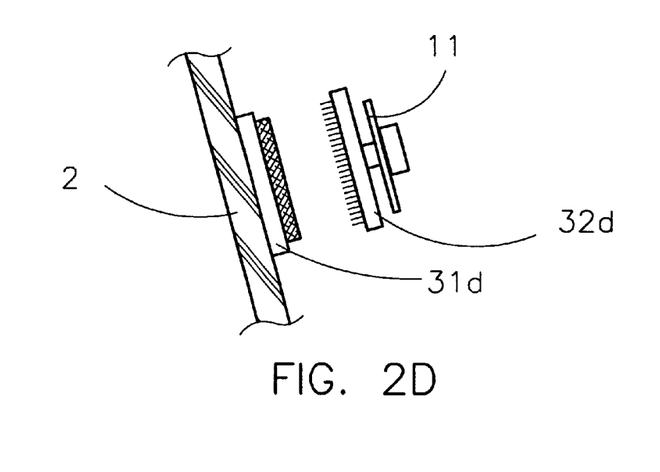
FIG. 2D is a side view of one of the ears of the present invention, attached to the car window by Velcro latches.

As a further way to fix the curtain 10, as shown in FIG. 2C, each of the ears 11 has a suction cup, so that the ears 11 are directly attached to the car window 2. Alternatively, as shown in FIG. 2D, each of the ears 11 has a VELCRO, or similar hook and loop fastener, latch 32d, with another Velcro latch 31d glued to the car window. The latches 31d, 32d are easily connected and separated.

Figure 3:
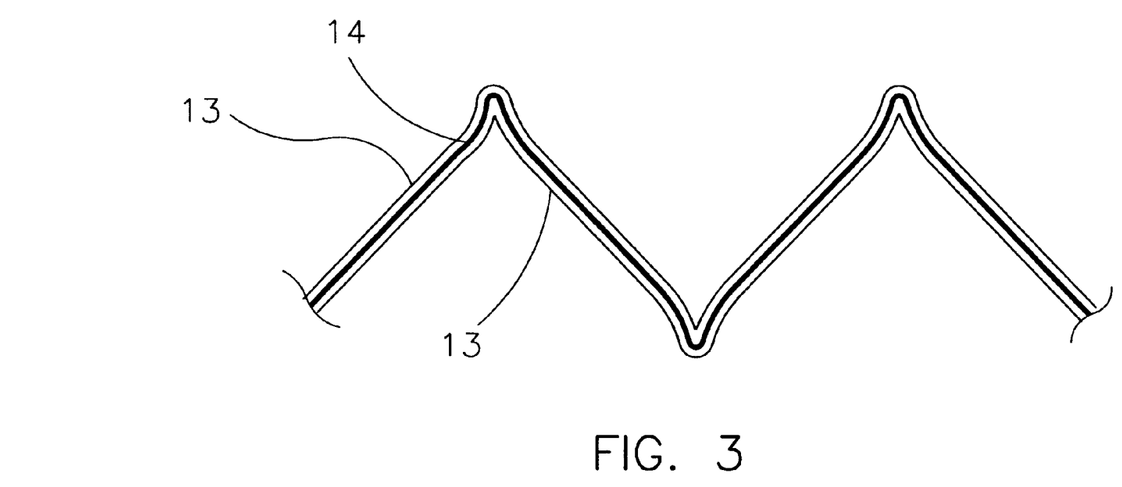
FIG. 3 is an enlarged top view of the curtain of the present invention.

Referring again to FIG. 1, the curtain 10 has a plurality of pleats bordering on each other at pleat edges 15. As shown in FIG. 3, the curtain 10 has a double outer membrane 13, covering a central reinforcing layer 14 on both sides thereof and glued thereon at high pressure. Thus the curtain 10 from outside looks like a single layer. A reflecting surface layer of electro-coated metallic gloss is added to enhance the sun-protective effect of the curtain 10.

Figure 4:
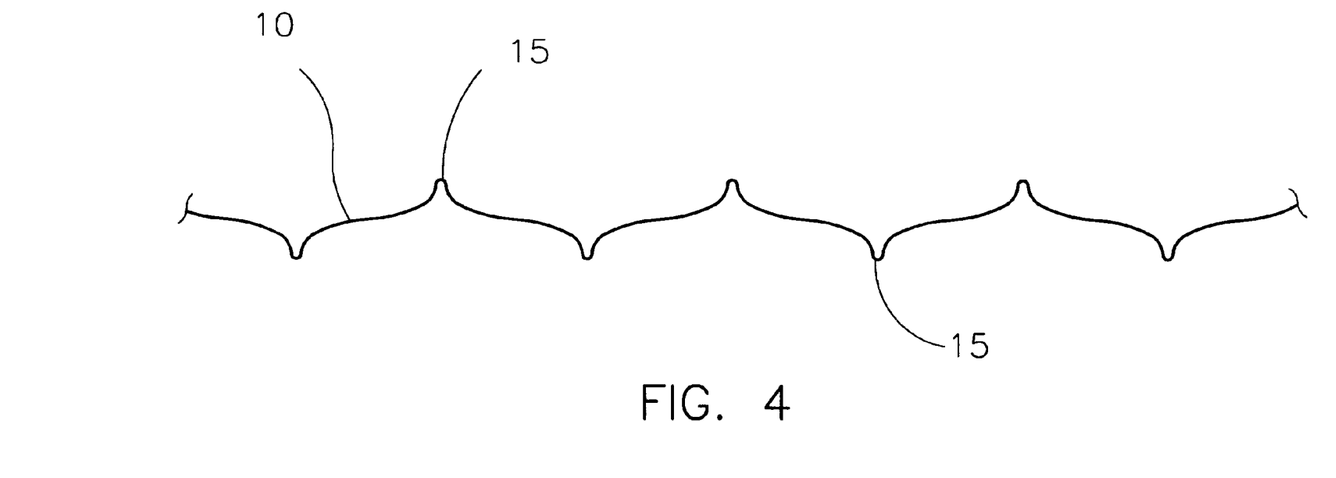
FIG. 4 is an enlarged top view of the curtain of the present invention when unfolded.

Referring to FIGS. 3 and 4, the main characteristic of the present invention is that the curtain 10 is produced using high temperature and high pressure. Thus the curtain 10 is made of material which resists changes of form. On each of the pleat edges 15 the curtain 10 has a high form stability. Even when the curtain 10 is unfolded, the pleat edges 15 maintain a sharp V-shaped form. For the reinforcing layer 14 thin material, like textile, plastics or cardboard is used. Working the material at high temperature and high pressure ensures that the pleat edges 15 remain pronounced.

Therefore, as shown in FIG. 2, when the curtain 10 is unfolded and hung on the fixing elements 30, covering the window 2, the curtain 10 is stable against deformation due to the V-shaped pleat edges 15. The curtain will not hang down, and no reduced protected area of the car window 2 will result.

Preferably, the width of the curtain 10 is slightly larger than the width of the car window 2. Then, after hanging the ears 11 of the curtain 10 over the hooks 31, with the curtain 10 unfolded, the curtain 10 will stay close to the car window 2 and will not bend down.

Figure 5:
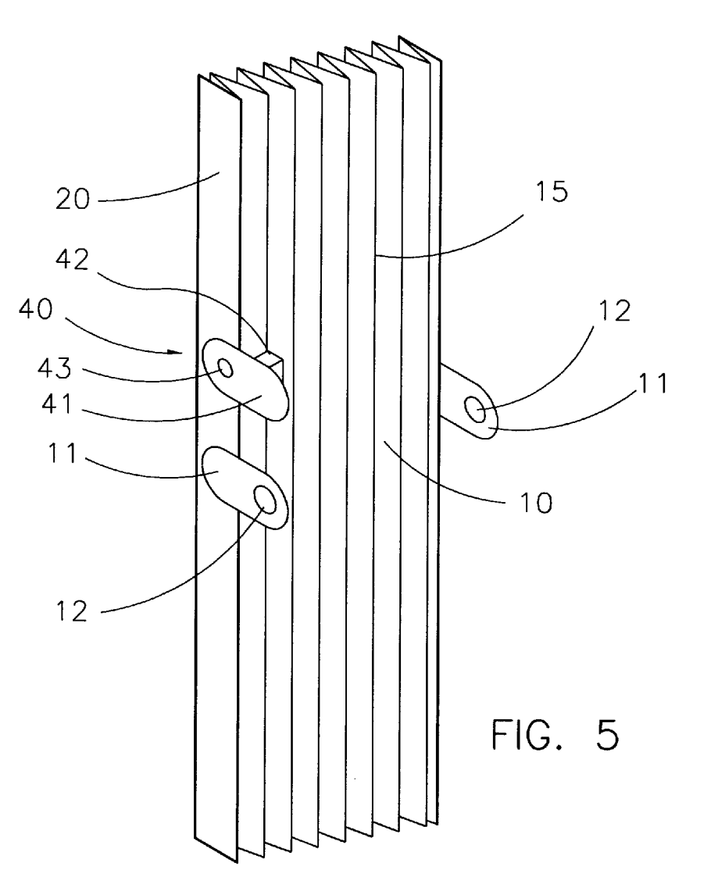
FIG. 5 is a perspective view of the pleated car curtain of the present invention in the second embodiment.
Figure 5A:
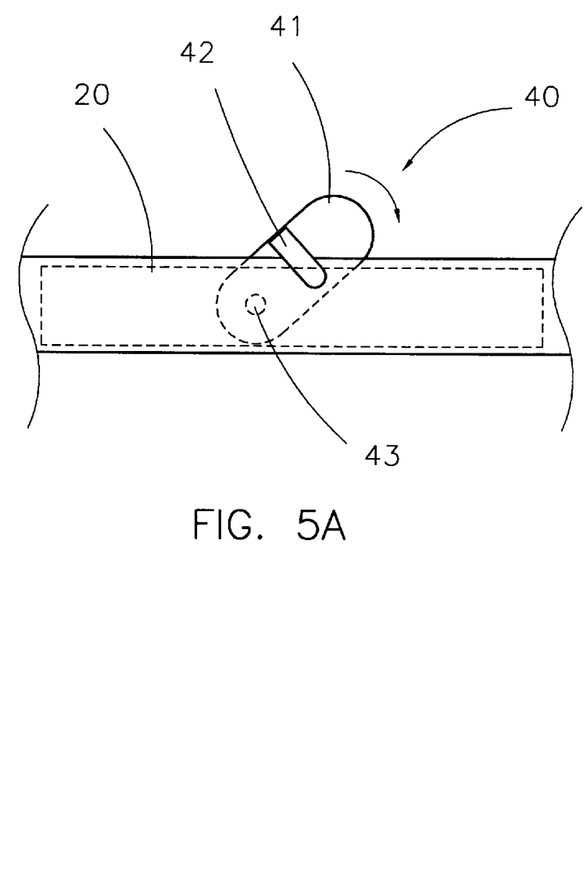
FIG. 5A is an enlarged schematic illustration of the pleated car curtain of the present invention in the second embodiment.

Referring to FIG. 5, the present invention in a second embodiment has on one of the reinforcing strips 20 a holding element 40. The holding element 40 has a main part 41 with an inner side facing the reinforcing strip. The main part 41 is by a pin 43 hingedly connected to one of the reinforcing strips 20. An L-shaped catch 42 is attached to the inner side, leaving a gap with a width that is larger than the folded thickness of the curtain 10 and the reinforcing strips 20, allowing to hold the pleated curtain together when folded. As shown in FIG. 5A, after folding the pleated curtain, the user turns, on each of the reinforcing strips 20, the main part 41 by 90 degrees, so that the catch 42 keeps the curtain 10 and the reinforcing strips 20 together like a bundle.

Figure 6:
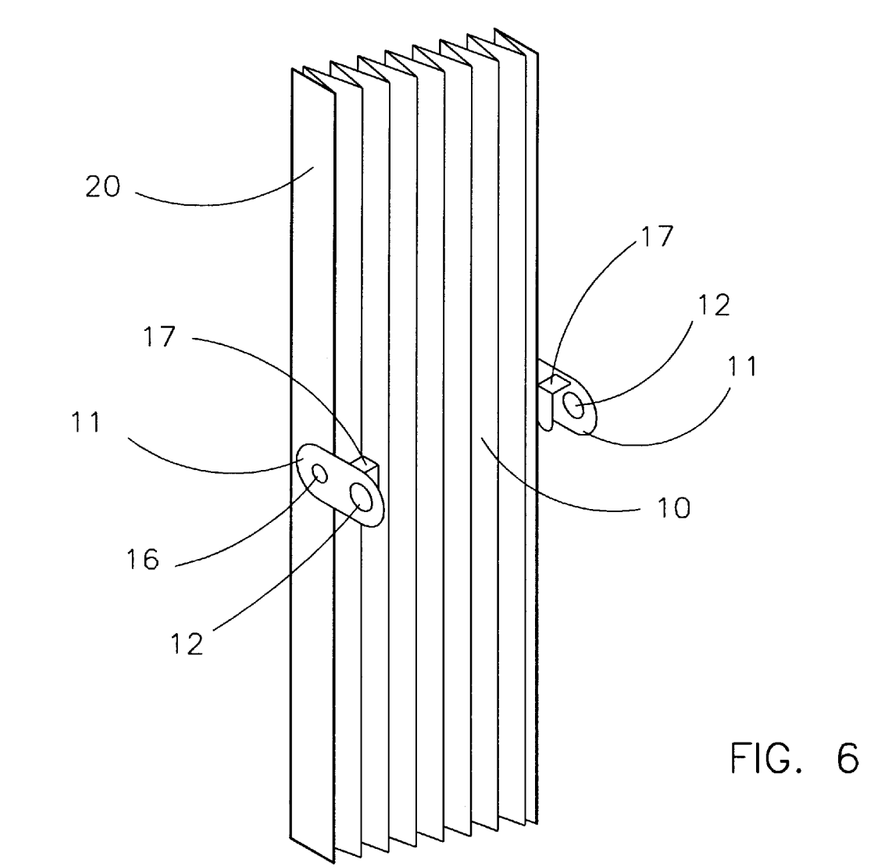
FIG. 6 is a perspective view of the pleated car curtain of the present invention in the third embodiment.

Referring to FIG. 6, in a third embodiment of the present invention, each of the ears 11 additionally has a holding function like the holding element 40 of the second embodiment. Each of the ears 11 has an inner side and is hingedly connected to one the reinforcing strips 20 via a pin 16. When the pleated curtain of the present invention is folded, the curtain 10 and the reinforcing strips 20 form a compact body with a folded thickness. For each of the ears 11, an L-shaped catch 17 is attached to the inner side, leaving a gap with a width that is larger than the folded thickness of the curtain 10 and the reinforcing strips 20, allowing to hold the pleated curtain together when folded. After folding the pleated curtain, a user turns the ears 11 by 90 degrees, so that on each of the left and right ends of the curtain 10 the catch 17 keeps the curtain 10 and the reinforcing strips 20 together. Thus folding and storing of the pleated curtain of the present invention is convenient.

Figure 7:
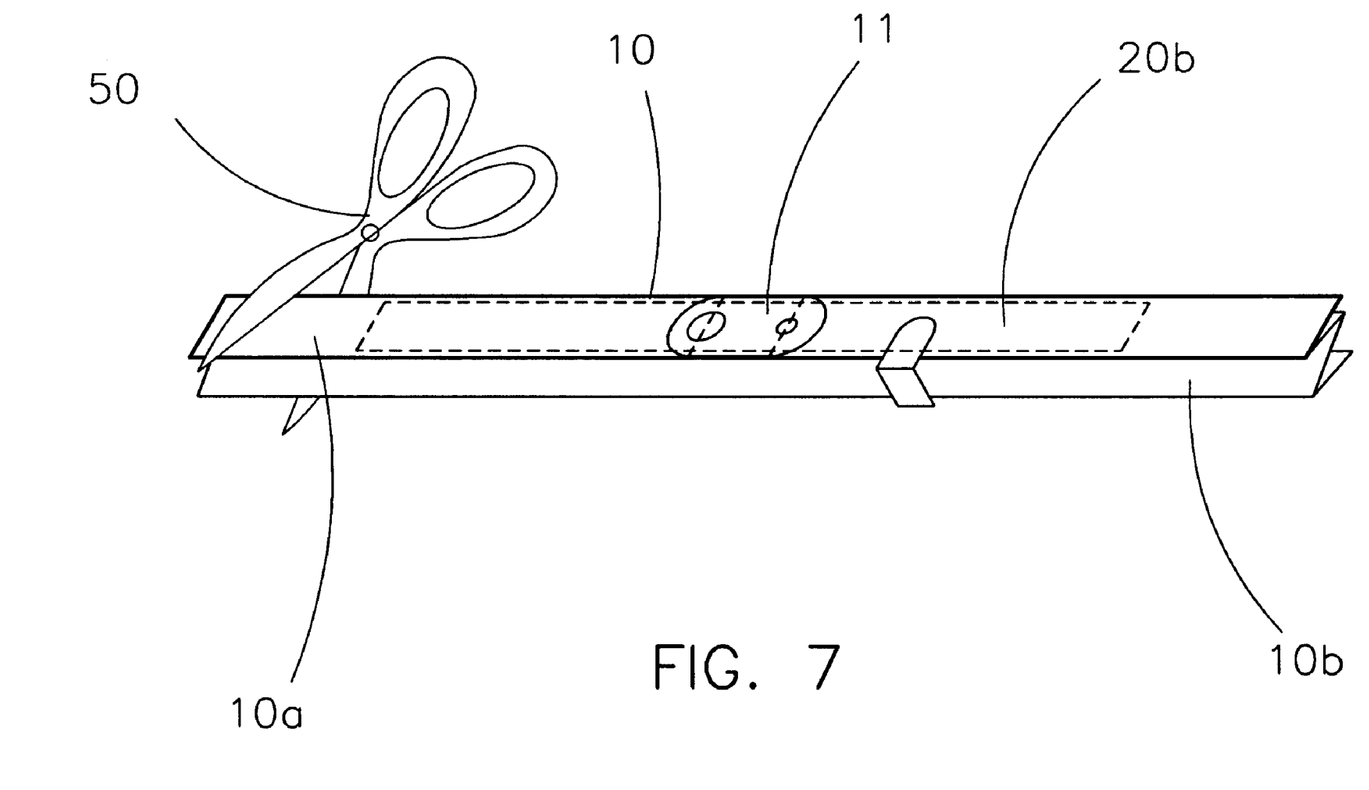
FIG. 7 is a perspective view of the pleated car curtain of the present invention in the fourth embodiment.

Referring to FIG. 7, the present invention in a fourth embodiment has short reinforcing strips 20b, leaving an upper section 10a of the curtain 10 and a lower section 10b of the curtain 10 uncovered. This allows the user to reduce the height of the curtain 10 easily by scissors 50, adapting to the car window 2 for optimum sun-protection.

The pleated car curtain of the present invention has the following advantages:

1. The curtain 10 is light and is, when not in use, stored in a compact bundle with little space requirement, making use thereof convenient.
2. When the pleated curtain is hung up, the curtain 10 will not sag, due to the pleated edges 15. With the reinforcing strips 20 stably connected to the fixing elements, the pleated curtain will not drop away from the car window 2.
3. Since the curtain 10 is made of thin material, the user easily adapts the pleated curtain to the car window 2 by cutting the upper and lower sections 10a, 10b of the curtain 10, as needed.
4. For fixing the pleated curtain, no structural parts of the car, like the rear-view mirror and the sun visors, need to be employed.
5. A simple structure makes the present invention suitable for mass production.
6. As compared to a conventional sun-protective shield, the present invention has a small volume when folded, which makes storing more convenient.

While the invention has been described with reference to preferred embodiments thereof, it is to be understood that modifications or variations may be easily made without departing from the spirit of this invention which is defined by the appended claims.

What is claimed is:

1. A pleated car curtain adapted to cover a car window comprising:

a curtain made of sun-protective material, said curtain has two lateral edges, a plurality of pleats parallel to said lateral edges, and a plurality of pleated edges between said pleats, said curtain is produced at high temperature and high pressure so that a shape of said plurality of pleated edges is preserved as acute angles when said curtain is folded and unfolded, two reinforcing strips on said lateral edges of said curtain, two ears, each of said ears is hingedly connected to a corresponding one of said two reinforcing strips, at least one catch, each of said catches being connected either to one of said two ears or to one of said two reinforcing strips, and two fixing elements adapted to be fixed on the car window on two sides thereof, said fixing elements holding said two ears when said curtain is in use, so that said curtain is kept parallel to the car window; wherein said car curtain forms a compact body with a folded thickness when folded, wherein said two ears have inner sides facing each other, each of said two catches is connected to one of said inner sides, having a width that is larger that said folded thickness, such that, after folding said curtain and turning said two ears by 90 degrees, said two catches hold said two reinforcing strips together, preventing said curtain from unfolding.

2. A pleated car curtain adapted to cover a car window comprising:

a curtain made of sun-protective material, said curtain has two lateral edges, a plurality of pleats parallel to said lateral edges, and a plurality of pleated edges between said pleats, said curtain is produced at high temperature and high pressure so that a shape of said plurality of pleated edges is preserved as acute angles when said curtain is folded and unfolded, two reinforcing strips on said lateral edges of said curtain, two ears, each of said ears is attached to a corresponding one of said two reinforcing strips, at least one catch, each of said catches being connected either to one of said two ears or to one of said two reinforcing strips, two fixing elements adapted to be fixed on the car window on two sides thereof, said fixing elements holding said two ears when said curtain is in use, so that said curtain is kept parallel to the car window, and a holding element, said holding element having a main part that is hingedly connected to one of said two reinforcing strips, having an inner side facing said curtain, and a catch, connected to said inner side, having a width that is larger than said folded thickness, such that, after folding said curtain and turning said two ears by 90 degrees, said catch holds said two reinforcing strips together.

* * * * *